United States Patent [19]

Reed et al.

[11] 4,447,199

[45] May 8, 1984

[54] APPARATUS FOR MAKING THERMOPLASTICS ARTICLES

[75] Inventors: Leonard W. Reed, Wantage; Robert M. S. Barr, Faringdon; David A. Dick, Wantage, all of England

[73] Assignee: Metal Box Limited, Reading, England

[21] Appl. No.: 322,380

[22] Filed: Nov. 17, 1981

[30] Foreign Application Priority Data

Nov. 19, 1980 [GB] United Kingdom ............... 8037137

[51] Int. Cl.³ .................... B29C 17/02; B29C 17/07; B29C 17/14
[52] U.S. Cl. ................................. 425/182; 264/532; 264/564; 425/527; 425/529; 425/296; 425/302.1; 425/325; 425/326.1; 425/387.1; 425/392
[58] Field of Search ............ 425/182, 183, 527, 529, 425/296, 302.1, 326.1, 387.1, 325, 392; 264/532, 564, 566, 567, 209.3, 209.5

[56] References Cited

U.S. PATENT DOCUMENTS

| 3,311,684 | 3/1967 | Heider ........................ 264/532 X |
| 3,390,426 | 7/1968 | Turner et al. ................. 425/529 X |
| 3,849,530 | 11/1974 | Wyeth et al. .................. 264/567 X |

FOREIGN PATENT DOCUMENTS 1136815 9/1962 Fed. Rep. of Germany ...... 264/532

Primary Examiner—Jan H. Silbaugh
Attorney, Agent, or Firm—Diller, Ramik & Wight

[57] ABSTRACT

Biaxially oriented tubular articles which are destined to provide bodies for processable food containers are made from an elongate tube of thermoplastics material as it emerges from an extruder. The manufacturing process comprises repeatedly performing a cycle of operations each including the following steps:

engaging the tube by a first clamping means (11,12) over a first region at a leading end of the tube (10) and by a second clamping means (13,14) over a second region at a spacing from the first region, so as to define between the clamping regions a portion of the tube to be longitudinally stretched and radially expanded;

moving the clamping means apart to stretch the tube portion longitudinally and admitting pressure fluid to the tube portion to expand it radially, such stretching and expansion forming a bubble (100) of biaxially oriented thermoplastics material adjacent the leading end of the tube; and severing (at 22) at least a substantial part of the bubble from the tube to form the tube with a new end as the said leading end of the tube for the succeeding cycle of operations.

20 Claims, 11 Drawing Figures

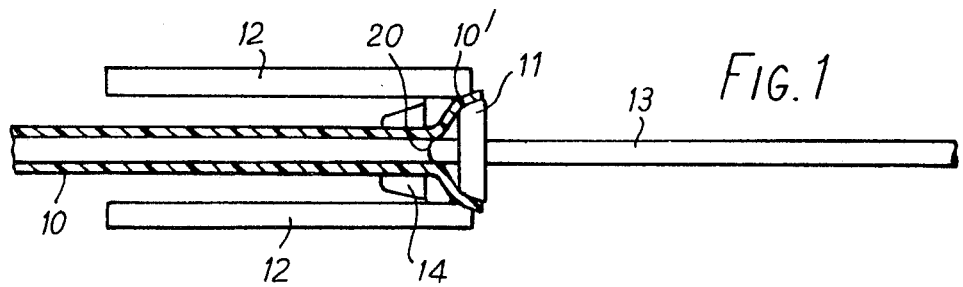
FIG. 1
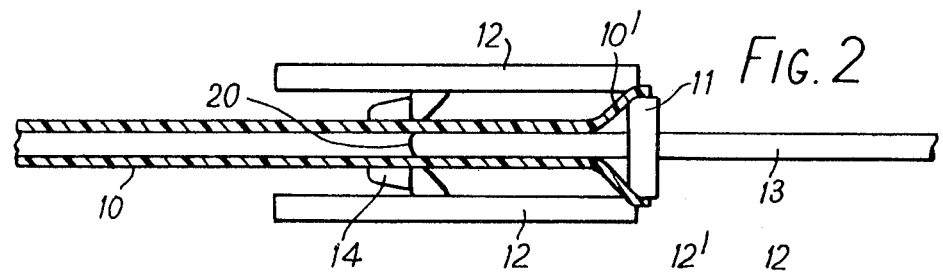
FIG. 2
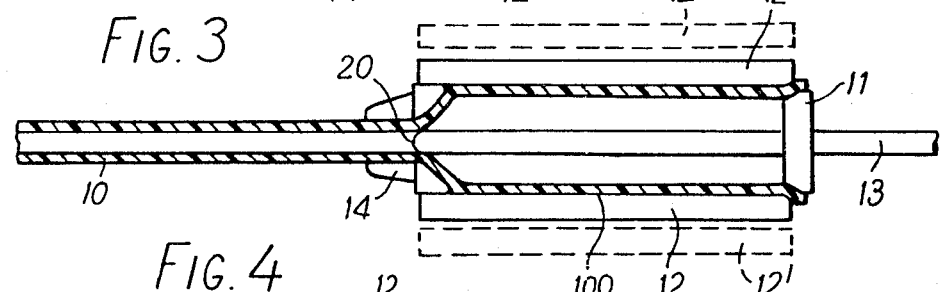
FIG. 3
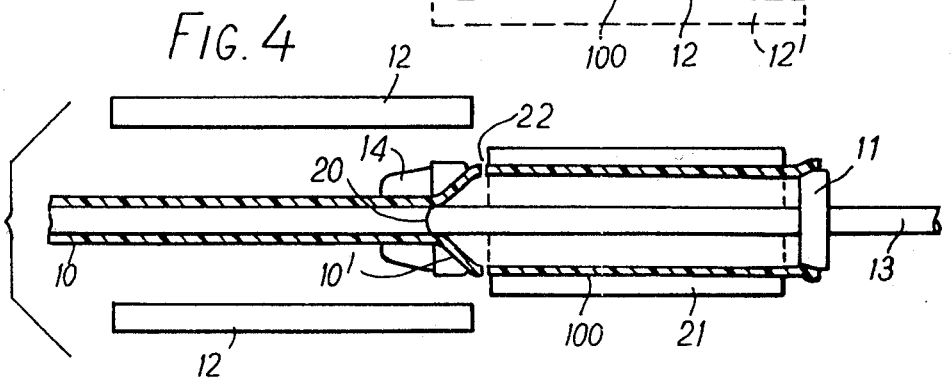
FIG. 4
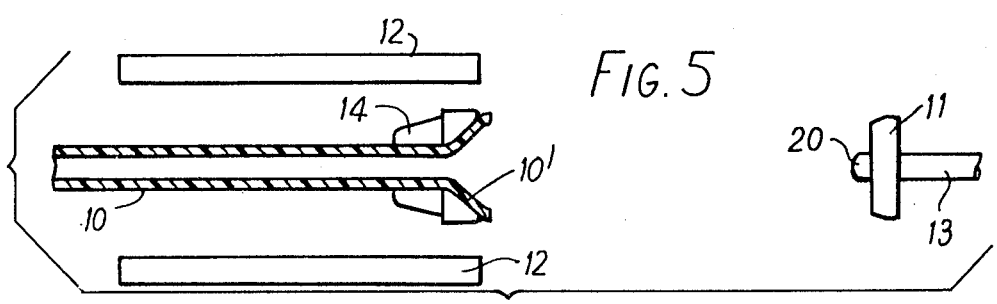
FIG. 5
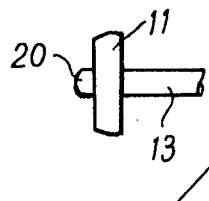

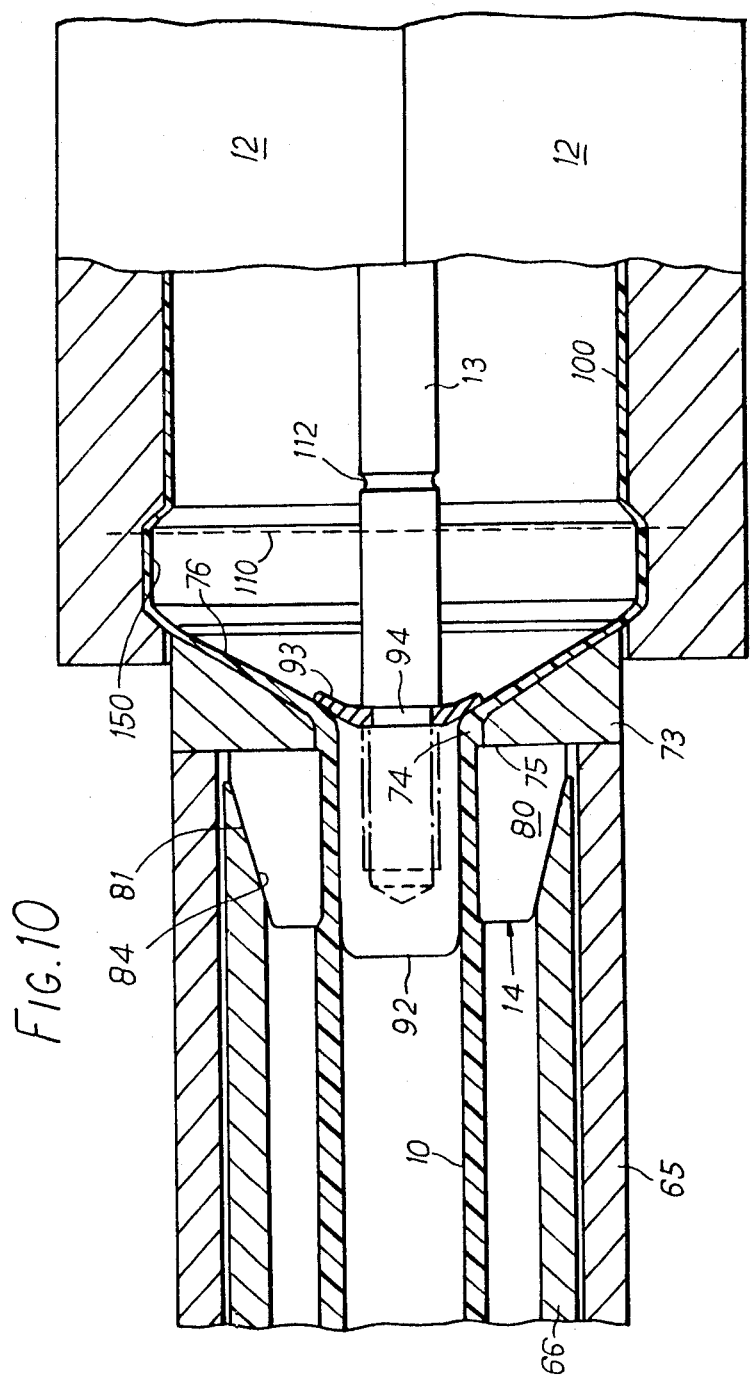

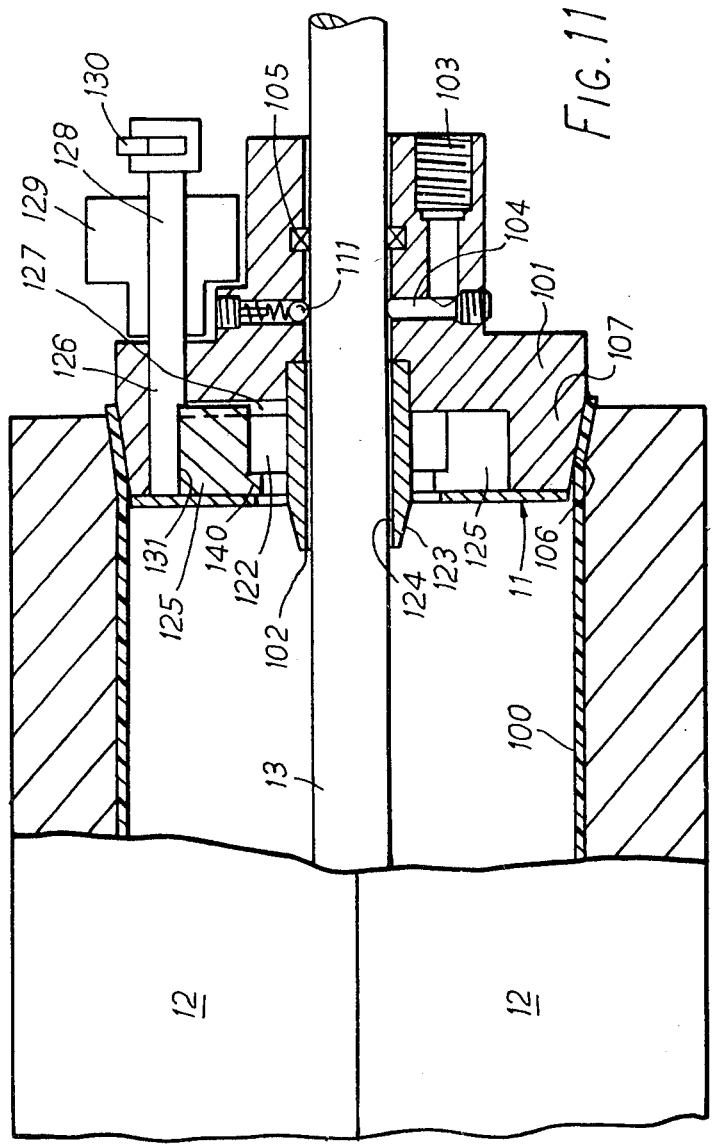

APPARATUS FOR MAKING THERMOPLASTICS ARTICLES

FIELD OF THE INVENTION

This invention relates to thermoplastics articles, and methods and apparatus for making them. In particular the invention concerns thermoplastics articles which are tubular and of which the thermoplastics material is, at least in part, biaxially oriented to give the articles enhanced physical characteristics.

BACKGROUND OF THE INVENTION

It is well known to form shaped articles from a thermoplastics material by extruding a tube of the thermoplastics material, repetitively enclosing a length forming the end of the extruded tube within a mould cavity, separating the tube lengths from the parent tube, and after separation inflating them individually with pressurised gas so as to conform them to the mould cavity and so form the shaped articles. Such a process in its basic form, usually referred to as "blowmoulding", is used, inter alia, for the manufacture of bottles for household and industrial use, in applications where the internal pressure is to be little or no greater than atmospheric pressure or, in other words, there is little or no overpressure. Bottles for carbonated beverages, however, may be required to withstand over-pressures of several atmospheres, and for such bottles a modification of the basic blowmoulding process, usually referred to as "stretch-blowmoulding", is used. In this process the individual lengths of extruded tube are stretched mechanically in their longitudinal direction prior to, or at the same time as, they are inflated; in a variation, injection-moulded preforms are used instead of the lengths of extruded tube. The longitudinal stretching together with the circumferential stretching which occurs during inflation molecularly orientate the bottle material both longitudinally and circumferentially of the bottles; this biaxial orientation gives the bottles the strength necessary for them to withstand the high over-pressures which may be generated by carbonated beverage products.

Another kind of container which may be subject to substantial over-pressures is the conventional three-piece food can, which is liable to over-pressure during processing by the food packer and/or during reheating by the consumer. Such cans are typically made of tinplate. This material is becoming expensive.

SUMMARY OF THE INVENTION

It is the applicants' belief that by making the tubular can wall of biaxially oriented plastics material instead of metal the cost of the article as a whole can be reduced without any substantial impairment of the ability of the can to withstand the overpressures to which it may be subjected. In addition to the cost advantages of the material itself, the use of thermoplastics material for the can wall may provide additional advantage in the ease of handling and storing the bulk material, the speed and relative quietness of the manufacturing process, and the consumer appeal of the finished can.

In accordance, therefore, with one aspect of the invention there is provided a container having a tubular wall of biaxially oriented thermoplastics material, and end closures closing the ends of the wall. The end closures may be of a metal such as tinplate or aluminium, although this is not essential. They may be attached releasably or otherwise.

Although such a container is of particular application to the packaging of processed foods, (in which case the thermoplastics material should be dimensionally stable at the processing temperatures which are to be used), this is not its only application. It might for example, be used, for carbonated beverages which may require no processing; furthermore, although the biaxial orientation of its wall makes it particularly suited to applications in which high overpressures are encountered, the enhanced physical characteristics provided by the biaxial orientation may be of value for containers which are required to withstand neither thermal treatment nor substantial overpressure.

Advantageously, one of the end closures of the container is of the easy-opening variety, having a removable portion which may be torn away by the user. Usually the easy-opening end closure will be of metal and of the restricted opening type for carbonated beverages, of the "full aperture" type for other products such as processed foods.

The tubular wall for the container may be manufactured by conventionally forming a shaped tubular article by stretch-blowmoulding, and cutting the article to provide one or more parts each suitable as the tubular wall of a container. However, such a method of manufacture is inherently slow and energy expensive in that a substantial part of the tubular article is not of the required shape or thickness. Applicants have devised a process by which to produce a tubular article of biaxially oriented thermoplastics material, of which an increased proportion is suitable for forming tubular walls for containers. Accordingly, from a second aspect, the invention provides a process for forming at least partly biaxially oriented tubular articles from an elongate tube of thermoplastics material, which comprises repeatedly performing a cycle of operations each including the following steps:

engaging the tube by a first clamping means over a first region at a leading end of the tube and by a second clamping means over a second region at a spacing from the first region, so as to define between the clamping regions a portion of the tube to be longitudinally stretched and radially expanded;

moving the clamping means apart to stretch the tube portion longitudinally and admitting pressure fluid to the tube portion to expand it radially, such stretching and expansion forming a bubble of biaxially oriented thermoplastics material adjacent the leading end of the tube; and severing at least a substantial part of the bubble from the tube to form the tube with a new end as the said leading end of the tube for the succeeding cycle of operations.

The word "bubble" here and henceforth in the specification and claims is not to be considered as necessarily denoting a substantially closed body. As manifest from the embodiment particularly described, it may be open at its end remote from the end at which it is, or was, connected to the tube.

In addition to a process as defined in the above paragraph, the invention also provides, from a third aspect, apparatus for forming at least partly biaxially oriented tubular articles from an elongate tube of thermoplastics material by a repeated cycle of operations, the apparatus comprising a first clamping means arranged for engaging a leading end of the tube over a first clamping region, a second clamping means arranged for engaging the tube over a second clamping region at a spacing from the first, the first and second clamping means being relatively reciprocable longitudinally of the tube, stretch means to move the clamping means apart with the tube engaged thereby so as longitudinally to stretch the portion of the tube lying between the clamping regions, fluid pressure means operable to supply pressure fluid to the interior of the tube portion so as to expand it radially, such stretching and radial expansion forming a bubble of biaxially oriented thermoplastics material adjacent the leading end of the tube, and severance means operable to sever at least a substantial part of the bubble from the tube to form the tube with a new end as the said leading end of the tube for the succeeding cycle of operations.

Although they have particular value in the manufacture of tubular, in particular right-cylindrical walls for containers, the above-defined process and apparatus are not to be considered as limited to such an application, but may be applied to the manufacture of other tubular articles from thermoplastics material which is at least partly biaxially oriented.

BRIEF DESCRIPTION OF THE DRAWINGS

These and other aspects and features of the invention will become apparent from the following description, given by way of example and with reference to the accompanying drawings in which:

FIGS. 1 to 5 diagrammatically show individual stages in the operating cycle of an apparatus in accordance with the invention to produce a tubular bubble of biaxially oriented thermoplastics material;

FIGS. 7 to 11 variously show the arrangement of a particular apparatus arranged to operate by the operating cycle of FIGS. 1 to 5; accordingly, the same reference numerals as FIGS. 1 to 5 are used to denote analogous parts. Of FIGS. 7 to 11 individually:

FIG. 7 shows the apparatus in side elevation;

FIG. 8 shows the apparatus in plan view;

FIG. 9 shows the apparatus in end elevation taken in section on the line IX—IX in FIG. 7;

FIG. 10 is an enlarged view of the apparatus taken in central longitudinal section at the end of a bubble-forming operation, showing the upstream end of the mould and the associated clamping arrangement for the tube material; and FIG. 11 similarly shows the downstream end of the mould and the associated arrangements for clamping the free end of the tube at the beginning of an operating run and thereafter.

DESCRIPTION OF PREFERRED EMBODIMENTS

Figure 6:
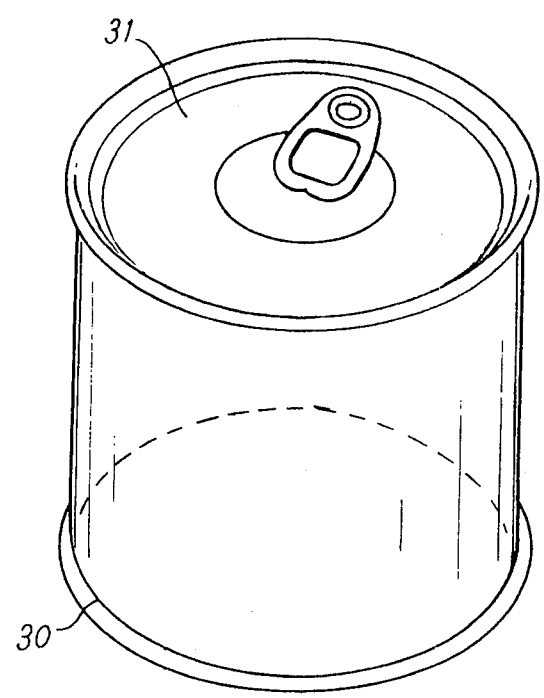
FIG. 6 shows a container having its cylindrical wall cut from the tubular bubble.

Referring now to FIGS. 1 to 5, an apparatus for forming tubular articles is arranged to perform repeated cycles of operation upon the right-hand end of a length of extruded tube 10 of PET (polyethylene terephthalate) material which is in a heat-softened amorphous condition.

FIG. 1 shows the apparatus at the beginning of an operating cycle. The leading end of the tube is flared from the previous cycle, and the flared portion 10' is clamped around its periphery by co-operation of a disc-like clamping member 11 on its inside and, on its outside, the leading or downstream ends of two mould halves 12 which are vertically separable as will later become apparent. The clamping member 11 and mould halves 12 thus form a clamping arrangement for the tube.

In addition to their vertical separation, the mould halves 12 are together reciprocable longitudinally in relation to the tube through a distance substantially equal to their length. At the moment of time depicted in FIG. 1 they are at the left hand (i.e. upstream) extremity of their longitudinal movement; also, they are closed to their cavity-forming condition.

In addition to the clamping member 11 and the mould halves 12, the apparatus further comprises a second clamping arrangement for the tube. This second clamping arrangement has an elongate mandrel 13 which extends horizontally from an actuator (not shown) on the right of the apparatus, through the centre of the clamping member 11, and terminates at a rounded free end 20 which at the condition of the apparatus shown in FIG. 1 is engaged in the mouth of the tube 10 proper at the base of the flared portion 10'. The mandrel is longitudinally reciprocable by means of its associated actuator (not shown), the position shown in FIG. 1 being its fully extended position. In general, it is freely slidable through the clamping member 11.

For co-operation with the mandrel to clamp the tube material the apparatus has an annular split collar 14 which in FIG. 1 is disposed within the mould cavity defined by the mould halves 12. For the purposes of the following description the collar should be considered as fixed in longitudinal position. The collar may be contracted by means not shown to clamp the tube material against the leading end of the mandrel, but it is to be understood that in the FIG. 1 condition of the apparatus the collar is open and the tube is free to move through it.

Following the clamping of the periphery of the flared portion 10' between the clamping member 11 and the mould halves 12, the mould halves are moved horizontally to the right through a predetermined distance, carrying with them the clamping member and the tube 10. A predetermined length of the tube is therefore drawn through the collar without stretching.

When the condition depicted in FIG. 2 has been reached the collar is closed onto the tube to clamp it against the mandrel 13. The portion of the tube then present within the mould is thereby clamped at its left hand end in addition to being clamped at its right hand end. Further rightward movement of the mould halves 12 and the clamping member 11 as before then causes this tube portion to be stretched longitudinally. At the same time as this longitudinal stretching is taking place, air at high pressure (e.g. 250 to 300 psi) is admitted to the interior of the tube portion so as to expand the tube portion radially into conformity with the mould cavity as a bubble at the leading end of the tube 10 immediately behind the flared portion 10'. Typically the stretch ratios achieved, that is to say, the ratios of the dimension when stretched to the original unstretched dimensions, are 2:1 in the axial direction and 4:1 in the radial direction. In the drawing the tube bubble is denoted by the reference number 100.

In known manner the combination of axial and radial stretching causes molecular orientation of the tube material in those directions, thus giving enhanced physical characteristics to the tubular article or articles which are to be formed from the bubble as is later to be described.

FIG. 3 shows the end of the stretch-blow operation, which occurs when the mould halves reach their right-hand limiting position. The tube within the mould is then fully stretched and in conformity with the mould cavity.

The FIG. 3 condition of the apparatus may be held for a period to allow the expanded tube material to harden, after which the tube bubble is vented to reduce its internal pressure to approximately atmospheric pressure, and the mould halves 12 are vertically separated to the positions 12' indicated by dashed lines in FIG. 3, so as to release the tube bubble for severance and ejection.

Severance of the bubble from its parent tube and subsequent ejection of the bubble are effected as shown in FIGS. 4 and 5. After the mould halves 12 have been separated they are moved to their upstream positions (FIG. 4), and a pair of opposed, contoured gripper members, one of which is shown in FIG. 4 and denoted by the reference numeral 21, are moved horizontally towards one another to positions in which they support the tube bubble gently but firmly between them. A knife is then operated transversely of the apparatus so as to sever the tube bubble from the parent tube 10, leaving the latter with a new flared leading end 10' for the subsequent operating cycle of the apparatus. For clarity, the knife is not shown in the drawings, but its position is indicated by the line of severance 22 separating the tube bubble from the parent tube. In order to facilitate cutting, the knife may be heated and/or a small positive pressure may be provided within the tube bubble to resist any tendency for the bubble to be collapsed inwardly by the knife. It will be understood from the drawings and the preceding description that after severance the "bubble" is substantially right-cylindrical.

After the bubble 100 has been severed, and while it is still held by the gripper members 21, the disc 11 and the mandrel 13 are withdrawn to retracted positions (FIG. 5) in which they are clear of the bubble, following which the gripper members are moved apart to allow the bubble to fall onto a suitable take-away device (not shown) such as a horizontal conveyor. The apparatus is then prepared for its next cycle of operations by advancing the clamping member 11 and mandrel 13 into engagement with the tube 10 at, respectively, the periphery and root of the flared end 10', and subsequently closing the mould halves 12 to clamp the flared end against the clamping member. The collar 14, which had been closed onto the tube for the stretch-blow operation to form the bubble 100 as described above, is opened for the new operating cycle at a convenient time; desirably it is held closed for the severance operation, so as to assist the gripper members 21 and the clamping member 11 to hold the tube and its bubble firmly in position while the knife is operating.

The bubble 100, after ejection from the apparatus, has its ends cropped to remove any flawed material and may then be subdivided into two or more lengths if desired. The one or more lengths of biaxially oriented tube so produced are substantially right-cylindrical and transparent, and may be used as the bodies of food containers. Typically for such an application, and as shown in FIG. 6, they are closed at each end by metal end closures 30, 31 which are glued, heat-bonded, and/or crimped into position; in FIG. 6 the closure 31 is shown to be of the full-aperture easy-open variety. If the containers are intended to be processable, that is, they are intended to be sterilised or pasteurised together with their contents, the length or lengths of biaxially oriented tube are held for a time at a temperature at least equal to, and preferably somewhat greater than, the sterilisation or pasteurisation temperature which is to be used whilst restrained from shrinking beyond their desired circumferential and longitudinal dimensions. In known manner this thermal treatment heat-sets the length or lengths of tube so that they are dimensionally stable during the sterilisation or pasteurisation process. The thermal treatment can be carried out before or after the lengths of tube have been cut from the bubble 100, and it is envisaged that the restraint required for the tube material during the treatment can be effected by pressurising the bubble.

A stretch-blow apparatus as shown in the drawings and described above may be linked directly with an extruder by which the tube 10 is continuously produced. In order for the cyclic operation of the apparatus to be correlated with the substantially constant speed of the tube in relation to the extruder, the extruder and/or the apparatus may be arranged to reciprocate in synchronism with the operating cycle of the apparatus; alternatively a take-up mechanism may be interposed between the extruder and the apparatus to convert the tube movement from the constant speed output of the extruder to the intermittent input movement required by the apparatus. In this way the apparatus may be arranged to automatically and repetitively produce bubbles 100 from a tube 10 continuously produced by the extruder.

In order to condition the tube for the stretch-blow operation, the tube emerging from the extruder is rapidly cooled (for example by a water bath) to approximately room temperature, the rate of cooling being such that the tube material maintains its amorphous condition. After cooling the tube is reheated by gas burners (for example) to the temperatures required for the stretch-blow operation. Typically the tube emerges from the extruder at 572° F., and after cooling is reheated to a temperature within the range 190° F.–250° F. for the stretch-blow operation. If desired, the apparatus may have provision for heating and/or cooling the tube to achieve temperature control.

Although the apparatus of FIGS. 1 to 5 is shown and described in relation to a tube 10 which is caused to move along a horizontal path, it may with advantage be arranged to operate upon a tube 10 which descends on a vertical path; FIGS. 1 to 5 should then be considered as being individually turned through 90° in a clockwise sense. With such an arrangement the tube extruder, if linked directly with the apparatus, may be mounted vertically above the latter, thereby facilitating the control of the tube in its movement between the extruder and the apparatus.

Reference is now made to FIGS. 7 to 11, which show a specific arrangement of the apparatus diagrammatically featured in FIGS. 1 to 5.

The apparatus has two horizontally spaced frame members 30, 31 supported by vertical legs 60 with feet 61, and between which extend a pair of horizontal and parallel guide rods 32.

A carriage 33 has guide blocks 42 by means of which it is guided for reciprocating horizontal movement along the guide rods 32 in response to a pneumatic actuator 34 having its cylinder 63 mounted outside the frame member 31. The piston 35 of this actuator extends horizontally through the frame member 31 to connection with the carriage 33 at a coupling 36 arranged to allow free vertical tilting movement between the piston and the carriage.

Figure 7:
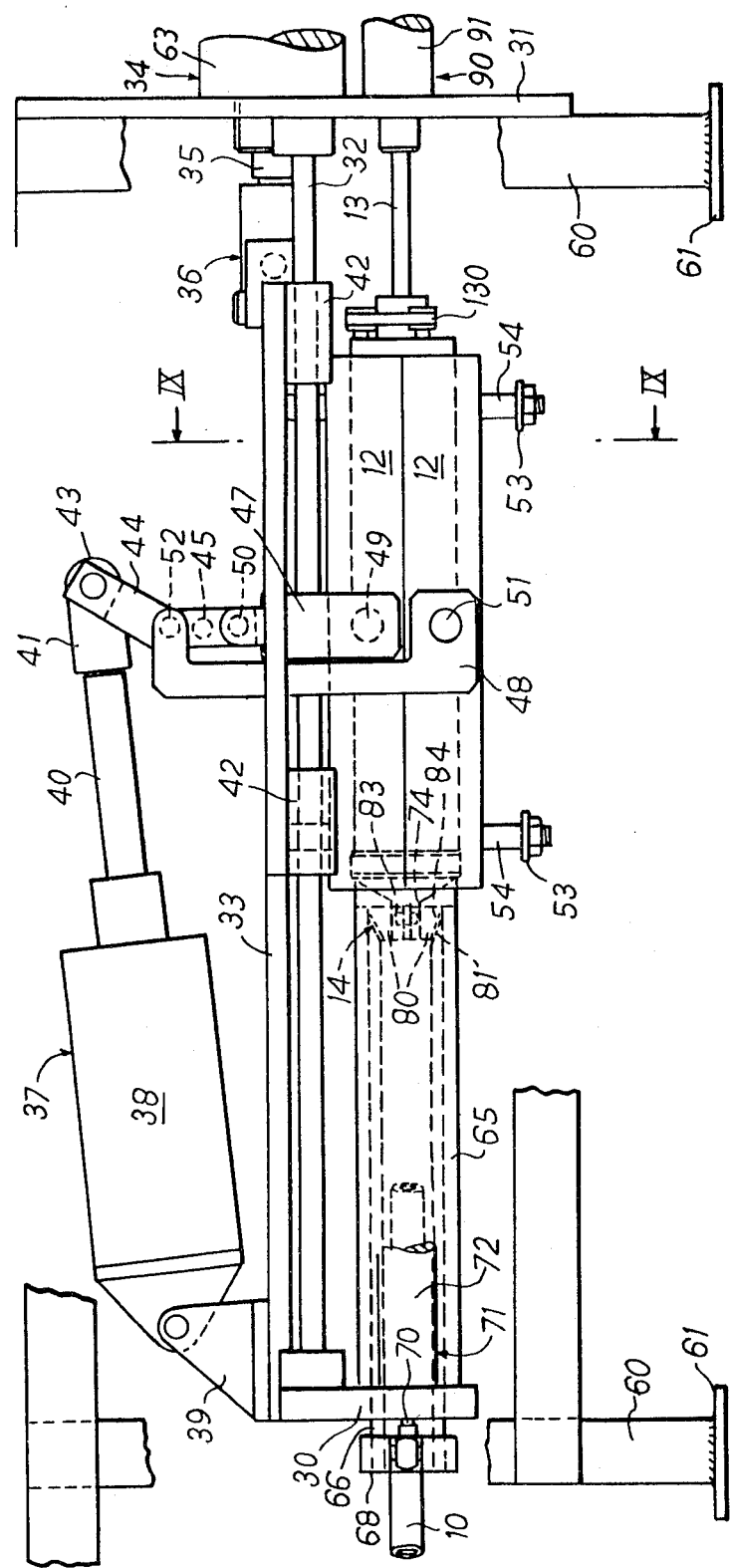
Figure 8:
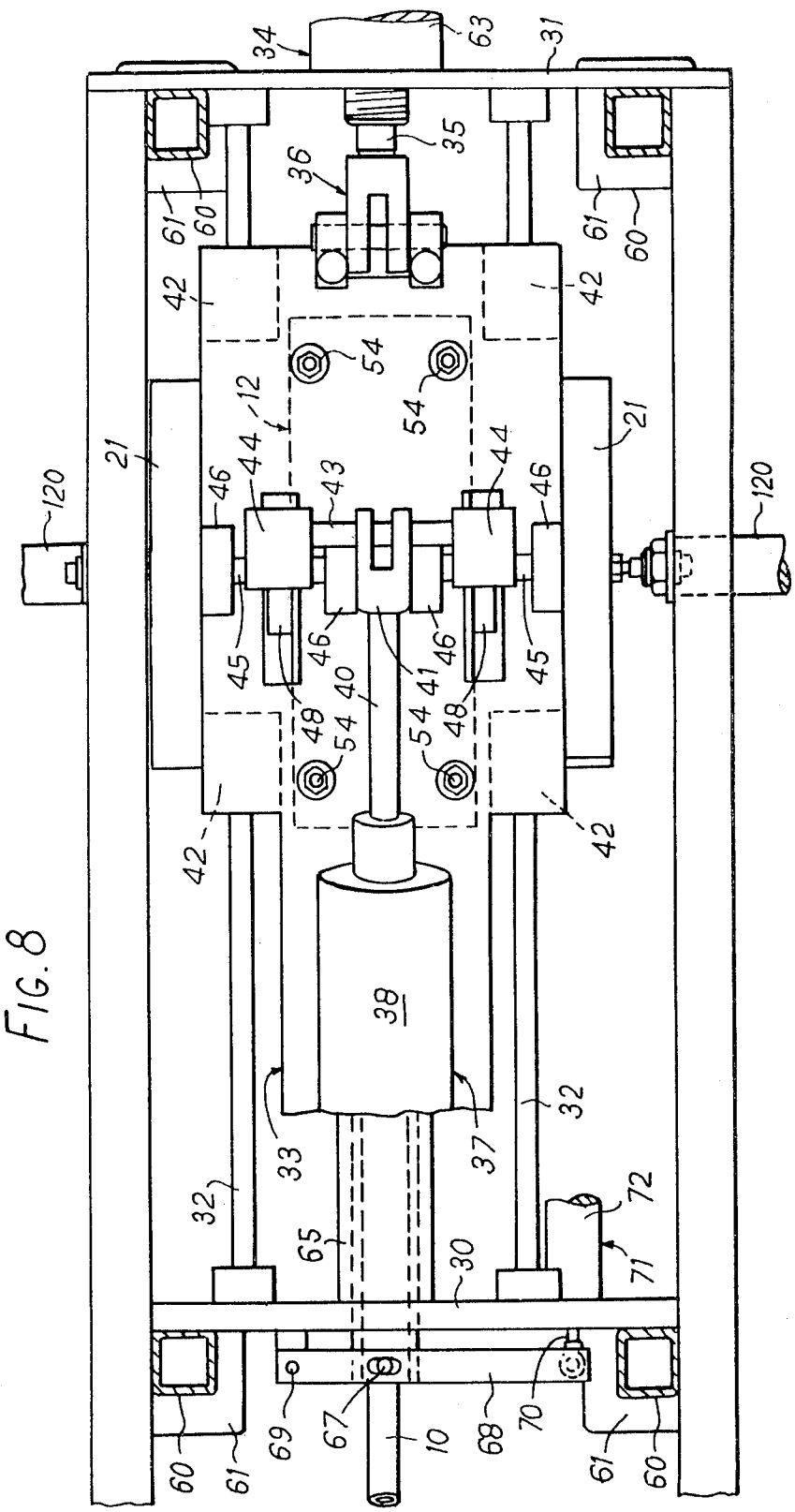
Figure 9:
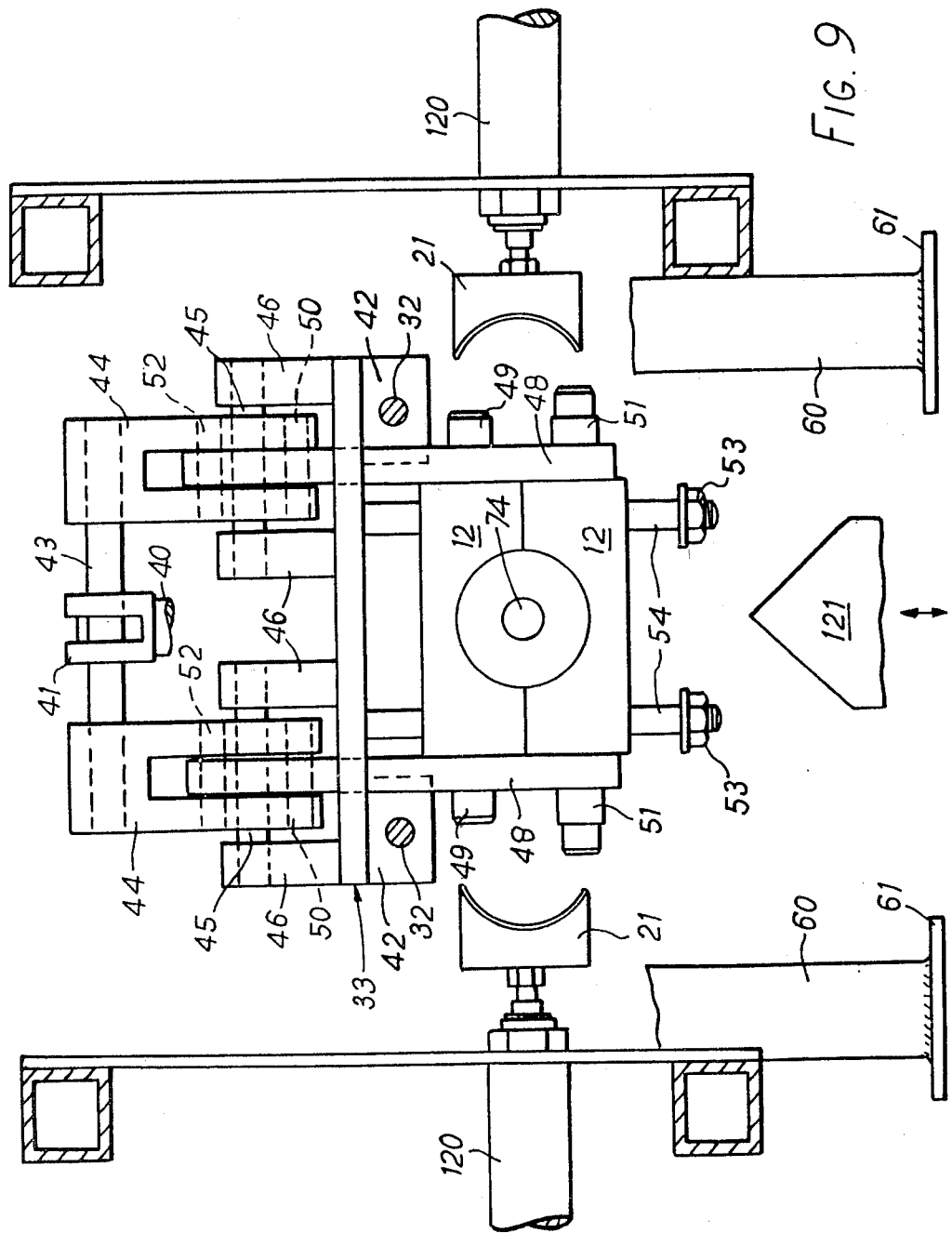

The carriage 33 carries the two halves 12 of the mould for the tube 10, the latter being visible in FIGS. 7, 8 as it enters the apparatus from the left. The mould halves, which are shown in their closed position, are vertically separable by means of a further pneumatic actuator 37 having its cylinder 38 pivotally mounted on the carriage at a mounting bracket 39. The piston 40 of the actuator 37 is arranged to operate on the two mould halves simultaneously, to lower the lower mould half and raise the upper mould half. For that purpose a head 41 mounted on the end of the piston 40 is pivotally connected by a horizontal spindle 43 to yokes at the top ends of two bifurcated link members 44 disposed one to each side of the head. The arms of the link members are cranked, each having a top end portion which is inclined in the direction away from the actuator 37, and a bottom end portion which extends vertically to the free end of the arm at the bottom of the link member.

Midway along the bottom end portions of their arms, the link members 44 are pivoted on respective spindles 45 journalled in mounting blocks 46 for movement about a common horizontal axis which is fixed in relation to the carriage 33. Pivotal movement of the link members as the actuator 37 is operated is transmitted to the mould halves 12 by means of a pair of short connecting plates 47 for the upper mould half and a pair of longer connecting plates 48 for the lower mould half. Each link member 44 is associated with one plate 47, 48 from each pair for a respective side of the mould.

The plates 47 are rectangular and vertically disposed; they are bolted to the upper mould half 12 at their bottom ends and at their top ends are pivotally attached to the link members 44 by spindles 50 located below the spindles 45. The plates 48 are C-shaped and disposed so as to embrace, with clearance, the associated plates 47; they are bolted to the lower mould half at their bottom ends and at their top ends are pivotally attached to the link members 44 by spindles 50 located above the spindles 45. At each side of the mould the spacings of the spindles 50, 52 from the associated spindle 45 are equal, so that operation of the actuator 37 causes equal and opposite movements of the mould halves towards or away from one another. Extension of the actuator causes separation of the mould halves, the available movement being sufficient to free the mould halves individually from a tube bubble 100 previously formed within the mould and to allow the mould halves to be subsequently moved to an upstream retracted position. A positive limit to the separating movement is provided by washers 53 on sleeved studs 54.

The mould is shown in the drawings in the downstream, closed condition which it has at the end of a moulding operation. It then encloses the right hand extremity of a horizontally disposed, circular tube 65 which is cantilevered at its left hand end from the frame member 30. The mould in its upstream, retracted position is in telescoped relation to this tube.

A circular sleeve member 66 slidable along and within the tube 65 projects beyond the frame member 30 where it is linked by diametrically opposed trunnion pins 67 to a horizontal operating arm 68. This operating arm is pivoted to the machine frame at 69 and its opposite free end is attached to the piston 70 of a pneumatic actuator 71 having its cylinder mounted on the frame member 30. It will be understood that operation of this actuator will cause the sleeve 66 to slide along and within the tube 65; the purpose of such movement will now become apparent from the following description which is given with particular reference to FIG. 10.

FIG. 10 is an enlarged view of the end of the tube 65 remote from the frame member 30. The end of the tube is provided by a circular endpiece 73 which is attached to the end of the tube proper and has a central aperture 74 dimensioned for the thermoplastics tube 10 to pass through it. Around the aperture the endpiece presents a plane wall 75 to the tube interior; in the downstream direction of the apparatus it presents a frustoconical face 76 which diverges from the orifice 74 to the endpiece periphery.

The plane wall 75 of the endpiece provides the reaction face for an annular split collar 14 formed of three identical collar elements 80 each occupying somewhat less than 120° of the collar circumference and of which two are visible in FIGS. 7 and 10. The collar elements are shaped to provide for the collar a frustoconical external surface 81 which faces outwardly and along the tube 65, and a central aperture 82 which is aligned with the aperture 74 of the endpiece 73.

Compression springs 83 (FIG. 7 only) between adjacent ones of the collar elements 80 bias the collar elements apart so that the segmented frustoconical surface 81 of the collar is held in camming engagement with a complementary frustoconical surface 84 formed on the end of the sleeve 66. When the actuator 71 is retracted, that is, when the sleeve 66 is at the leftmost end of its travel (as seen in FIGS. 7 and 8), the central aperture 82 of the collar is of the same diameter as the central aperture 74 of the endpiece, and the tube 10 can move freely through both apertures. However, by extending the actuator 71 to move the sleeve 66 to the right, the collar 14 is contracted and the aperture 82 is closed down to a diameter which is somewhat smaller than the external diameter of the tube 10. The collar therefore engages the tube periphery as described in relation to FIGS. 1 to 5.

In addition to the tube 65, the sleeve 66, and the mould formed of the mould halves 12, FIG. 10 shows the mandrel 13 in the extended position in which it engages the interior of the thermoplastics tube 10 within the collar 14 so as with the collar to form a clamping arrangement enabling the portion of the tube 10 lying within the mould halves 12 to be stretched and simultaneously blown to form the tube bubble 100.

The mandrel 13 is the piston of a pneumatic actuator 90 having its cylinder 91 mounted on the frame member 31 beneath the cylinder 63 of actuator 64. For engaging within the tube 10 it has a nose 92 of the appropriate diameter screwed onto its free end. A flexible annular sealing washer 93 is located in a peripheral groove 94 formed around the mandrel immediately behind the nose so as to form a seal with the interior of the tube 10 and thereby prevent the escape of pressurised fluid along the interface between the nose 92 and the tube when the bubble 100 is being formed.

FIG. 11 shows the clamping member 11 in its engagement with the mould halves 12 to clamp the periphery of the previously flared end 10' of the tube 10 for the formation of the bubble 100. The clamping member has a circular body 101 formed with a central aperture 102 through which the mandrel 13 passes with a small clearance 124. Interconnected ports 103, 104 provide a passage through which the pressurised air required for blowing the bubble may be fed to the interior of the tube 10 via this clearance from a suitable supply (not shown). A sealing ring 105 engages the mandrel 13 to prevent escape of the pressurised gas along the clearance in the opposite direction.

To assist the clamping member 11 initially to enter the flared end of the tube 10, the clamping face 106 on the body 101 of the clamping member is frustoconical, and the flared end itself has an enlarged diameter by virtue of a groove 150 which extends around the mould cavity where the flared end is formed. The clamping face provided on the mould halves 12 for co-operation with the clamping face 106 is denoted 107.

Features of the apparatus other than those described above will become apparent from the following description of the apparatus in operation. Initially it will be assumed that with the mould open and at the left hand end of its travel as seen in FIGS. 7 and 8, the last tube bubble 100 to be formed has just been severed from the tube 10 and ejected from the apparatus. At this time the end of the tube 10 left remaining is flared, its free edge being located at the position indicated by the dashed line 110 in FIG. 10 within the groove 150; moreover, the mandrel 13 is in a retracted position with the clamping member located longitudinally on it by a spring-loaded ball 111 (FIG. 11) engaged in a detent 112 (FIG. 10) on the mandrel.

The actuator 90 is extended to engage the clamping member 11 within the periphery of the flared end of the tube 10, and to engage the nose 92 within the tube at the base of the flared end. The clamping member engages the tube before the nose so that during the latter part of the mandrel movement the ball 111 is forced out of the detent 112 and thereafter the mandrel slides freely through the clamping member.

After the actuator 90 has been extended the mould halves are closed by extension of the actuator 37 to clamp the flared end of the tube against the clamping member 11, whereupon the actuator 34 is retracted to move the mould progressively to the right as seen in (FIGS. 7 and 8), carrying the clamping member 11 with them. During an initial part of this movement the collar 14 is open so that the tube 10 is drawn freely through it and over the mandrel 13. However, at a predetermined position of the mould halves in their rightward movement, the actuator 71 is extended to close the collar 14 onto the tube 10 after which continued movement of the mould halves stretches the portion of the tube lying within the mould while pressurised air is simultaneously admitted to the interior of the tube via the ports 103, 104. In this way a bubble 100 conforming to the interior of the mould is formed on the tube, as depicted in FIGS. 10 and 11 which respectively show the left and right hand ends of the mould at the end of the bubble formation.

After the thermoplastics material of the bubble has solidified the mould halves 12 are separated by the actuator 37 and returned to their upstream, retracted positions by the actuator 34, leaving the bubble 100 supported at its left hand end by the endpiece 73 and at its right hand end by the clamping member 11. A pair of opposed gripper members 21 are then simultaneously operated by pneumatic actuators 120 to grip the bubble firmly but gently while a knife 121 (FIG. 9) operated by a further actuator (not shown) severs the bubble along the line 110 (FIG. 10) to free the bubble from the tube 10 leaving the latter with a flared end for the succeeding cycle of operations.

The mandrel 13 is then retracted by the actuator 90 to withdraw it from the severed bubble 100. As the mandrel approaches the end of its movement the ball 111 re-engages in the detent 112 so that the clamping member 11 moves with the mandrel out of engagement with the bubble, leaving the bubble free to fall away for cropping and subdivision as desired when, later, the gripper members 21 are retracted by respective actuators 120.

Following ejection of the bubble 100, the mandrel 13 is advanced to engage the tube 10 with its nose 92 and with the clamping member 11 as previously described. The cycle of operations described above is repeated to form the next bubble 100. In passing it will be noted that each bubble as severed from the parent tube 10 incorporates, in usable form, a large proportion of the flared end 10' left on the tube when the preceding bubble is severed. It is hoped that the percentage of the tube 10 material which is unusable in the severed bubbles can be reduced to 2% or below.

For the first cycle of an operating run, the apparatus may be required to operate upon a tube 10 which initially is not flared at its leading end. The clamping member 11 and mould halves 12 are then incapable of achieving the required clamping engagement at their clamping faces 106, 107, but instead the clamping member 11 is itself arranged to clamp the leading end of the tube to enable the first bubble 100 to be formed.

From FIG. 11 it will be seen that the clamping member 11 has a blind annular opening 122 facing in the upstream direction of the tube 10 in concentric relation with the aperture 102 for the mandrel 13. Radially on its inside the opening is defined by a clamp sleeve 123 which is fast with the body 101 of the clamping member and forms part of the clearance 124 with the mandrel 13. Radially on its outside the opening 122 is defined by three identical clamping elements which are held captive by a face plate 140 on the body 101, and each of which occupies somewhat less than 120° of angle. The clamping elements, of which two are visible and indicated by the reference numeral 125, have clamping projections 140 and are biassed outwardly away from one another by compression springs (not shown) between adjacent elements; they are guided individually for radially inwardly movement in relation to the opening 122 by lands 126 which are engaged in radially directed grooves formed in the body 101. One of the side faces of one such groove is shown in FIG. 11 in relation to the associated land 126, and indicated by the reference numeral 127. Each clamping element has an associated rotatable shaft 128 which is journalled in the body 101 and which mounts a pulley 129. The pulleys of the three elements are linked by a non-slip belt 130 (FIG. 7). The uppermost one of the shafts 128 is extended beyond the pulley 129 and carries an actuating lever 130 arranged for engagement, when the mould halves are brought together, by a resiliently-mounted plate (not shown) mounted on the upper mould half.

Each shaft 128 is machined with a flat 131. The clamping elements 125 make camming engagement with their associated flats, so as to be depressed radially inwards against the action of the springs when the shafts 128 are turned.

In the radially depressed position of the clamping elements the clamping projections 140 are capable of clamping the unflared end of a tube 10 received within the opening 122 against the clamp sleeve 123.

It will thus be understood that when, as previously described, the mould halves are in their upstream, retracted positions and the actuator 90 is extended to insert the mandrel nose 92 within the tube 10, the unflared end of the tube enters the opening 122 so as to be held securely there when the mould is closed by engagement by the projections 140. Subsequently, the mould is moved in the downstream direction and a bubble 100 is formed from the tube 10 in the manner described above, with the difference that the free end of the tube is gripped within the opening 122 instead of between the clamping faces 106, 107. After the first bubble 100 of the operating run has been formed and ejected, the tube 10 is flared for each of the subsequent bubbles.

Although in the apparatus described with reference to FIGS. 7 to 11 each bubble 100 is severed from the parent tube 10 at a position such that part of the bubble is left as the flared end of the tube for the succeeding cycle of operations, this is not essential to the invention; it is possible for the tube end to be unflared for each cycle of operations, and for each bubble to be severed from the tube completely. The apparatus shown in FIGS. 7 to 11 could, for example, be modified to operate in this way by arranging the knife 121 to operate on the tube between the collar 14 and the endpiece 73 to sever the bubbles 100 individually from the tube, and by advancing the tube 10 to feed its free end into the opening 122 for each bubble-forming operation.

Furthermore, although the bubbles 100 produced by the described apparatus are cropped and then used (with subdivision or otherwise) to form one or more tubular bodies for containers, a tubular article produced by a method or apparatus in accordance with the invention may have utility in its own right, (i.e. without cropping or subdivision). The bubble may be cut from the parent tube so as to have a portion of the tube at each end; one or both of the portions of tube may subsequently be formed, for example, with screw threads for receiving a screw closure. In one possible application the bubble is provided with portions of the unexpanded tube at each end and is cut in half to form two bottle-like articles each having a reduced-diameter neck and an open end, the articles are individually provided with end closures of metal, paper and or plastics to close the open ends, and screw-threads to take screw closures are formed on the necks either before or after the bubble is subdivided.

What is claimed is:

1. Apparatus for forming a plurality of at least partly biaxially oriented tubular articles from a common elongate tube of polymeric/copolymeric thermoplastics material by a repeated cycle of operations, which comprises a first clamping means for clampingly engaging a leading end of the tube over a first clamping region, a second clamping means for clampingly engaging the tube on its outside and sealingly on its inside over a second clamping region which is at a spacing from the first clamping region and is intermediate the tube length, while maintaining the tube in an open condition at said second clamping region, the first and second clamping means being relatively reciprocable longitudinally of the tube, stretch means to move the clamping means apart with the tube clampingly engaged thereby so as longitudinally to stretch the portion of the tube lying between the clamping regions, fluid pressure means operable to supply pressure fluid to the interior of the tube portion so as to expand it radially, such stretching and radial expansion forming a bubble of biaxially oriented polymeric/copolymeric thermoplastics material adjacent the leading end of the tube, and severance means operable to sever at least a substantial part of the bubble from the tube to form the tube with a new end as the said leading end of the tube for the succeeding cycle of operations.

2. Apparatus according to claim 1, which further includes a mould having a mould cavity within which the tube portion may be confined during its stretching and expansion to form the bubble, the bubble thereby being conformed to the mould cavity by the pressure fluid, the mould comprising a plurality of portions which are closable together to form the mould cavity but which are separable to enable the tube bubble to be ejected.

3. Apparatus according to claim 2, wherein the first clamping means comprises the mould portions, and a clamping member which is insertable into the tube end, the mould portions being adapted, when closed to form the mould cavity, to clamp the tube end against the clamping member.

4. Apparatus according to claim 3, wherein the severance means is positioned to leave part of the bubble as the tube end for the succeeding operation, the tube end thereby being flared.

5. Apparatus according to claim 3, wherein the second clamping means comprises an elongate clamping mandrel arranged to extend into the tube from the clamping member at the tube end, and a collar having an aperture for receiving the tube therethrough and contractable to clamp the tube against the mandrel at the second clamping region.

6. Apparatus according to claim 5, wherein the collar comprises a plurality of relatively movable clamping elements which present a common frustoconical surface facing away from the said tube end and are biassed resiliently apart to limiting, non-operative positions, for contracting the collar onto the tube the second clamping means comprising a collar actuating member with an aperture for receiving the tube therethrough and having a frustoconical surface for complementary engagement with the frustoconical surface of the collar, and an actuator arranged for moving the collar actuating member longitudinally of the tube in the direction towards the tube end whereby to close the clamping elements together.

7. Apparatus according to claim 3, wherein the mould portions are mounted on a carriage which is reciprocable longitudinally of the tube between an upstream position and a downstream position, the mould portions being separated during carriage movement in the upstream direction, for each downstream carriage movement the first clamping means being effective for the whole of the movement but the second clamping means and the fluid pressure means being effective for only a latter part of the movement, the formation of the bubble thereby occurring during the said latter part of the movement.

8. Apparatus according to claim 7, which includes gripper members operable when the carriage is in its upstream position to support the tube bubble for severance by the severance means.

9. Apparatus according to claim 1, wherein the severance means comprises a knife operable transversely of the tube.

10. Apparatus according to claim 4, having an auxiliary clamping means for operation instead of the first clamping means when the tube end is unflared for the first operating cycle of a sequence of cycles.

11. Apparatus according to claim 10, wherein the auxiliary clamping neans comprises a plurality of clamping elements which are mounted on the clamping member and simultaneously movable from non-operative positions to positions in which they externally engage the tube end to clamp the tube end between them.

12. Apparatus according to claim 1, when operatively linked with an extruder arranged for extruding the tube at a substantially constant extrusion speed, the extruder and/or the apparatus being reciprocable longitudinally of the tube to correlate the continuous motion of the tube as it emerges from the extruder with the intermittent advancing movement of the tube as said tubular articles are formed therefrom.

13. Apparatus for forming a plurality of at least partly biaxially oriented tubular articles from an elongated tube of polymeric/copolymeric thermoplastics material by repeatedly performing a cycle of operations comprising:

means for clampingly engaging an elongated tube of polymeric/copolymeric thermoplastics material by a first clamping means over a first region at a leading end of the tube and by a second clamping means over a second region at a spacing from the first region and is intermediate the tube length, so as to define between the clamping regions a portion of the tube to be longitudinally stretched and radially expanded;

said second clamping means clampingly engaging the tube on its outside and sealingly on its inside, while maintaining the tube in an open condition at said second clamping region;

means for moving the clamping means apart while the tube portion is clamped therebetween to stretch the tube portion longitudinally and means for admitting pressure fluid to the tube portion for expanding it radially whereby such stretching and expansion forms a bubble of biaxially oriented polymeric/copolymeric thermoplastics material adjacent the leading end of the tube; and means for severing at least a substantial part of the bubble from the tube to form the tube with a new end as the said leading end of the tube for the succeeding cycle of operations.

14. Apparatus for forming a plurality of at least partly biaxially oriented tubular articles from polymeric/copolymeric thermoplastics material comprising means for extruding a tube of heated polymeric/copolymeric thermoplastics material, first clamping means for internally and externally peripherally clampingly engaging a leading end of the tube at a first clamping region, second clamping means for internally and externally periherally clampingly engaging a peripheral portion of the tube at a second clamping region which is spaced a predetermined distance from said first clamping region and is intermediate the tube length to define between said first and second clamping regions a clamped tube portion of predetermined length, means for defining a mold cavity surrounding said clamped tube portion, said mold cavity having a predetermined size greater than said predetermined distance and said predetermined length, said second clamping means being located within said mold cavity in a first position medially of said mold cavity predetermined size, and means for relatively moving said first and second clamping means to increase said predetermined distance and stretch said clamped tube portion beyond said predetermined length toward said predetermined size.

15. The apparatus as defined in claim 14 including means for fluidically expanding an interior of said clamped tube portion during the relative movement of said first and second clamping means.

16. The apparatus as defined in claim 14 including means for fluidically expanding an interior of said clamped tube portion during the relative movement of said first and second clamping means, and means for severing said expanded tube portion between said first and second clamping means.

17. The apparatus as defined in claim 14 wherein one of said first and second clamping means includes an internal clamping mandrel.

18. The apparatus as defined in claim 14 wherein both of said first and second clamping means includes an internal clamping mandrel.

19. The apparatus as defined in claim 14 wherein said second clamping means includes an internal clamping mandrel.

20. The apparatus as defined in claim 14 including means for fluidically expanding an interior of said clamped tube portion during the relative movement of said first and second clamping means, means for severing said expanded tube portion between said first and second clamping means and immediately adjacent said second clamping means, means for opening said mold cavity to discharge said expanded tube portion therefrom, and means for moving said second clamping means along a remaining portion of said tube incident to the operation of said first and second clamping means.

* * * * *